United States Patent

Brochu et al.

[11] 4,005,625
[45] Feb. 1, 1977

[54] TREE SLASHER

[76] Inventors: André Brochu; Adrien Brochu, both of P.O. Box 332, Stratton, Maine 04982

[22] Filed: Apr. 17, 1975

[21] Appl. No.: 568,902

[52] U.S. Cl. ................... 83/100; 83/169; 83/425.1; 83/425.2; 83/435; 83/435.2

[51] Int. Cl.² ............. B27B 17/00; B27B 25/04

[58] Field of Search ........... 83/100, 928, 169, 435, 83/435.2, 425, 425.1, 425.2, 425.3; 144/252 R

[56] References Cited

UNITED STATES PATENTS

| 823,506 | 6/1906 | Cadorette et al. | 144/252 R |
|---|---|---|---|
| 2,554,989 | 5/1951 | Johnson et al. | 83/435 |
| 2,569,878 | 10/1951 | Avinger et al. | 83/435.2 |
| 2,815,048 | 12/1957 | Davis | 83/928 |
| 3,010,538 | 11/1961 | Strunk | 83/169 |
| 3,111,146 | 11/1963 | Schnepel | 83/928 |
| 3,747,457 | 7/1973 | Thompson | 83/928 |

*Primary Examiner*—Donald R. Schran
*Attorney, Agent, or Firm*—C. Yardley Chittick

[57] ABSTRACT

A tree slasher in which the entire trunk of a tree may be simultaneously cut into a plurality of selected lengths to meet subsequent processing requirements. The slasher, while large, is mobile and may, if desired, be taken to the vicinity of the tree-cutting areas thereby to minimize the distances the tree trunks must be hauled prior to cutting.

15 Claims, 9 Drawing Figures

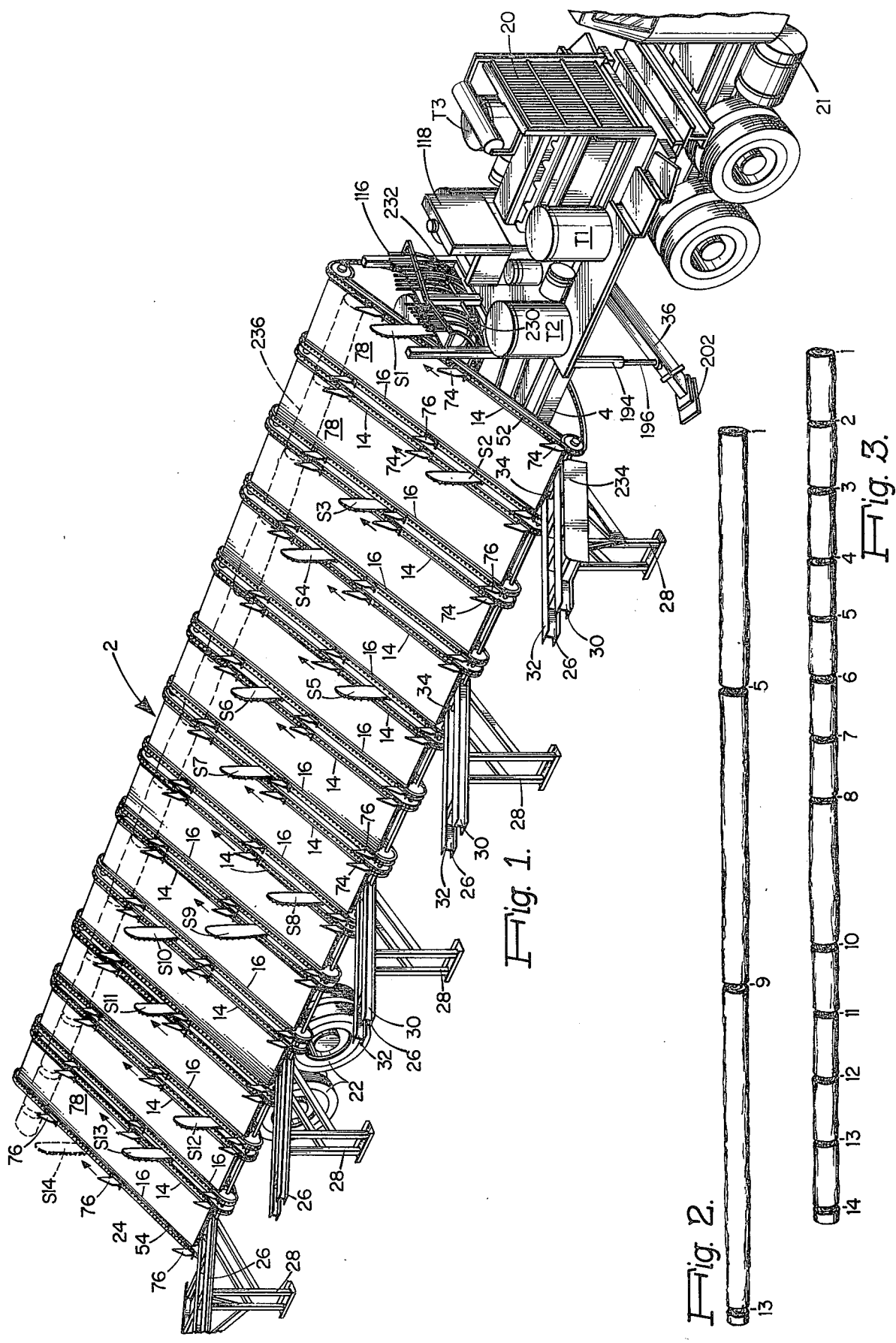

TREE SLASHER

BACKGROUND OF THE INVENTION

Gang saws for cutting long lengths of board, logs or tree trunks into a plurality of shorter lengths are very old. The concept of arranging the saws in staggered order to prevent binding which often happens when the saws are aligned, is like-wise well understood. In general, the saws used in prior tree slashers have been circular saws which are expensive. When circular saws are damaged to the extent that replacement is necessary, the slasher must be shut down for a relatively long time to make the change. Chain saws as substitutes for circular saws have come into limited use in some of the smaller machines. Those machines, however, that are large enough to slash whole tree trunks simultaneously into multiple lengths still rely primarily on the circular saws. Likewise, while log slashers have been mounted on wheels to facilitate transport of the slasher to the logging site, the general practice is to establish the slasher at a relatively permanent location and bring the logs or tree trunks to the machine for cutting.

The following U.S. patents are illustrative of the prior and present state of the art: Allen, No. 95,406; Stearns, No. 238,815; Williams, No. 247,791; Murray, No. 288,723; Gately, No. 487,947; Perron, No. 832,273; Cleveland, No. 1,082,405; Kramer, 1,122,402; Sturm, 1,332,477; Richardson, No. 1,969,425; Gerdine, No. 2,635,659; Tanguay, No. 3,500,882; Dobbs, No. 3,604,481; Neumann, No. 3,623,517; and Heimeri, No. 3,771,395.

It will be noted in the foregoing mentioned prior patents that extensive work has been done in the art of tree slashing and the somewhat related field of lumber trimming. Circular and chain saws have been used; the sawing units have been used mounted on wheels for transportation to desired sawing locations; when gangs of saws are used, it would appear that circular saws are preferred; when a number of logs are to be sawed simultaneously, a chain saw having greater length than the workable radius of the average circular saw is often used.

Individual saws of gang saw assemblies have been made moveable to be withdrawn from cutting position when no cut at that location is wanted.

In summary, it would appear in the tree slasher art that the prior patentees have tried many combinations of saws, various drives for saws, mobile and permanently located slashers but in spite of the wealth of knowledge in this field, no tree slasher has emerged which has found general acceptance by the large corporations which are continuously engaged year after year in the felling of trees and the subsequent cutting of the tree trunks into appropriate lengths for processing into paper pulp, into cut lumber or whatever.

SUMMARY OF THE INVENTION

In the invention of this application, a large number of known devices have been combined in a novel manner to function as a tree slasher with results far superior to any of the devices of the prior patented art and superior to any of the tree slashers that are currently in use in the logging industry.

Basicly the invention is in the form of a large long rigid unit made principally of conventional structural steel elements welded together to form a frame one end of which is mounted on wheels and the other end is carried by the fifth wheel of a tractor or by other suitable supports.

The frame has a plurality of spaced pairs of cross wise extending, upwardly sloping steel beams in the form of U-shaped channels with their open sides up over which each tree trunk travels. The tree trunk is initially horizontally positioned lengthwise of the frame at the lower ends of the sloping cross beams.

A plurality of continuous conveyor chains are located in the channels. Each chain has dogs thereon to grip and move each tree trunk sidewise up the sloping channels and as the tree trunk so moves, it is engaged by a plurality of longitudinally spaced non-aligned chain saws which cut the trunk into a plurality of sections of predetermined lengths. Each chain saw is located between adjacent channels and the related conveyor chains.

When the cut sections of the tree which are now logs, reach the upper ends of the sloping channels being propelled by the dogs on the conveyor chains, they fall simultaneously from the high side of frame to the adjacent ground. Successive falling logs cause piles of logs to accumulate along side the slasher frame from which place they may continuously or periodically removed by a suitable log picker. The logs as they are cut cannot fall between the channels because there are steel plates between each pair of channels over which the tree and the cut sections move.

The disposition of the cut logs after falling from the machine is a matter of choice and does not constitute any part of the invention.

Another important part of the invention resides in the mounting of the chain saws, means for moving each of the saws from an up position in which it engages and cuts the tree to a down position at which the tree passes thereover and is not cut. By virtue of the controllability of each saw by an operator sitting at the end of the frame where he may overlook and supervise the entire operation, successive trees may be cut into logs of different selected lengths to provide the most desirable output.

Another important feature is the construction and operation of a fluid drive means for all of the chain saws. This is achieved by the use of a single internal combustion engine of adequate capacity which drives a plurality of fluid pumps. Each pump drives hydraulic fluid to the fluid driven motors of a selected group of chain saws, which saws run continuously so long as the source pump is in operation. Collectively the several pumps driven by the prime mover keep all of the chain saws in operation whether they are in operative cutting position or in down inoperative position.

By means of separate hydraulic piping systems but utilizing part of the fluid output of the pumps, the position of each saw may be controlled by the operator. The saw position may be changed from cutting to non-cutting position in a matter of seconds so the log length in successive trees passing across the sloping support beams may be varied according to the operator's judgment or order requirements.

Another important improvement is found in the diposition of the chips produced by the cutting blades or teeth on the chain saws. Conventionally such chips would be allowed to fall to the ground beneath the saws. This, of course, requires periodic removal when the slasher is not running. In the present invention a new precedure is used. A housing of novel construction is placed immediately below the cutting side of each saw so that all chips fall into each saw's housing. Each housing is in direct connection with a suction pipe actuated by a large blower. All of the suction pipes deliver their chips to a final larger output pipe which directs all chips from all saws to a single collection location which may be a container, a truck or other mean for taking the chips to some remote disposal point. It might be mentioned that the chips produced by a chain saw, while not of a preferred size in the making of paper, nevertheless are large enough to be used in making a lower grade paper.

Thus the chip collecting mechanism makes it possible to saw the trees into logs without the creation of useless piles of chips and sawdust and at the same time to create a residue having some economic value.

BRIEF DESCRIPTION OF THE DRAWINGS

FIG. 1 shows a perspective view of the tree slasher with its near end carried by the fifth wheel of a tractor and its far end supported on trailer wheels.

FIG. 2 shows a tree trunk that has been cut by the slasher into relatively long lengths.

FIG. 3 shows a tree trunk which has been cut by the slasher into short and intermediate lengths.

DESCRIPTION OF A PREFERRED EMBODIMENT OF THE INVENTION

Figure 4:
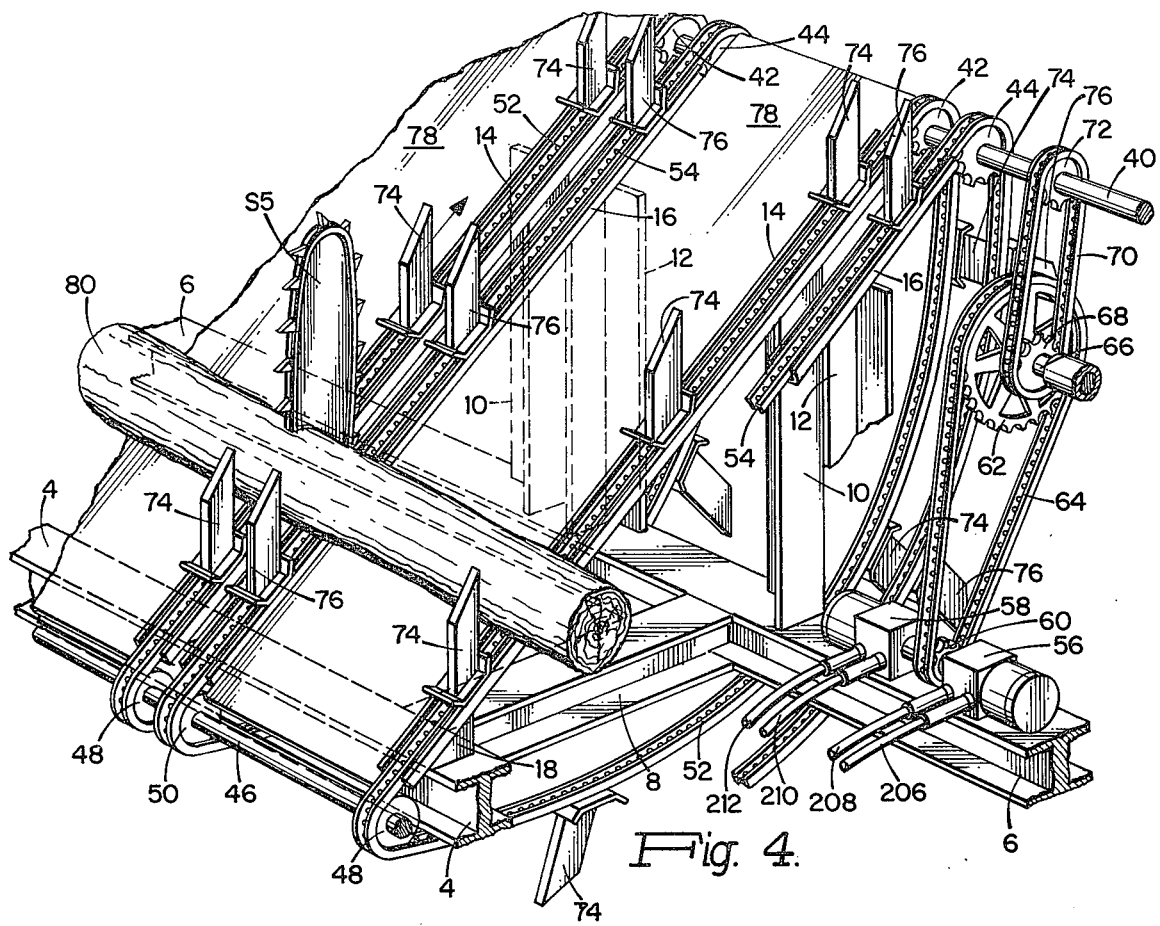
FIG. 4 shows an enlarged broken away section of the frame illustrating the conveyor drive and a part of a tree being cut by one of the chain saws.

Referring first to FIG. 1, the slasher generally referred to at 2 is shown in stationary operative condition ready to receive successive tree trunks and to cut the trunks into a plurality of predetermined lengths.

The machine is formed from two or more longitudinally extending heavy eye beams 4 and 6 (see FIG. 4) and a suitable number of cross beams 8 all welded together to create an extremely strong rigid base frame.

Mounted on beam 6 are a plurality of vertical beams 10 and 12 arranged side by side for supporting the upper ends of inverted channels 14 and 16. The lower ends of channels 14 and 16 are secured to beam 4 by suitable short intermediate supports 18.

The aforesaid basic frame structure is made as long as the trees it is to cut and of a width preferably not in excess of that permitted on roads over which the slasher may be moved.

On the near end of the slasher frame as viewed in FIG. 1 is a powerful internal combustion engine 20 which supplies the power for all of the various operations. The frame end beneath the engine rests on the fifth wheel (not shown) of a tractor 21. The tractor 21 ordinarily acts as the support for the slasher during operation but it will be understood that when the slasher is to remain in one location for an extended time, the tractor may be disconnected and other supports placed under the frame end.

The far end of the frame is mounted in conventional manner on trailer wheels 22. In some cases it may be preferable to have the trailer wheels located under the engine 20 and the fifth wheel connection with the tractor 21 at the other end 24 of the frame.

When the machine is in operation a plurality of removable tree receiving supports 26 with legs 28 are spaced along the side of the frame as shown in FIG. 1. These supports made of braced steel beams 30 and 32 slope upwardly at a sufficient angle to make a V shaped tree receiving position at the base of the sloping surface of frame 2. When the slasher is to be moved over the road, the supports are either disconnected from the frame or by means of pivots at 34 are swung up and over to lie against the sloping surface of the frame 2.

In order to give added rigidity to the frame when the slasher is in operation, a pair of stabilizers may be utilized. One of the stabilizers is shown at 36. The stabilizers are pivotally mounted on the undersides of the beams 4 and 6. They are forced against the ground by hydraulic cylinders and pistons which are under the control of the operator and which will be referred to in more detail hereinafter.

THE CONVEYOR

Referring again to FIGS. 1 and 4, it will be seen that there are twelve pairs of channels 14 and 16, preferably uniformly spaced over the length of the frame. At the near end is a single channel 14 and at the far end 24 is a single channel 16.

Along the top edge of the sloping part of the frame is a drive shaft 40 (see FIG. 4) carried in bearings mounted on the upper rear portion of the frame. Shaft 40 carries a plurality of sprockets 42 and 44, each sprocket 42 being aligned with the upper end of a corresponding channel 14 and each sprocket 44 being aligned with the upper end of a correspondng channel 16.

At the bottom edge of the sloping frame is a shaft 46 carrying a plurality of idler pulleys 48 and 50 which are aligned with the lower ends of channels 14 and 16 respectively.

In channels 14 and 16 are conveyor chains 52 and 54 respectively. Each chain 52 passes over its sprocket 42, then passes down and below beams 6 and 4 and around idler 48 back into channel 14. Similarly each chain 54 passes over its sprocket 44, then down and below beams 6 and 4 and around its idler 50 back into channel 16.

The shaft 40 is driven at a suitable speed by a pair of hydraulic motors 56 and 58 having a common shaft on which is mounted a sprocket 60. Sprocket 60 drives a larger sprocket 62 by chains 64. Shaft 66 keyed to sprocket 62 also is keyed to a smaller sprocket 68 which through chain 70 drives sprocket 72 keyed to shaft 40.

Thus when motors 56 and 58 are placed in operation, all sprockets 42 and 44 are rotated and all conveyor chains 52 and 54 move in their channels 14 and 16 at equal speeds.

The motors 56 and 58 are reversible so the chains 52 and 54 can be made to travel forward or backward in the channels 14 and 16.

Each chain has affixed thereto a set of uniformly spaced dogs, 74 on chain 52 and 76 on chain 54. The dogs are aligned on the adjacent chains and also aligned over the length of the frame as can be clearly seen in FIG. 1.

The dogs are of sufficient height to engage a tree that has been placed at the bottom of the sloping frame and, moved by the chains, will propel the tree upward across the sloping frame.

At the near end of the frame in FIG. 1 is a single channel 14 with chain 52 and dogs 74. At the far end 24 is a single channel 16 with chain 54 and dogs 76. Between each pair of channels 14 and 16 is a steel plate 78 carried by subsidiary structure mounted on the main frame. These plates prevent any of the cut pieces from falling into the framework and insuring that each cut piece will be carried to the top of the sloping surface and then dropped at the side of the machine.

THE CHAIN SAWS

Again referring to FIGS. 1 and 4 it will be seen that the adjacent channels 14 and 16 are far enough apart to permit the introduction therebetween of a chain saw. These saws are numbered in FIG. 1 S1, S2, S3, S4, S5, S6, S7, S8, S9, S10, S11, S12, S13 and S14. For convenience, it will be assumed that the saw shown in FIG. 4 is saw S5. The two saws S1 and S14 are the only saws that can be shut down while the others are in operation. If, however, they are needed to saw off any overhang they can immediately be placed in operation.

While each saw is visible in FIG. 1 and in position to cut a tree advanced upwardly against it as illustrated by saw S5, which is cutting through tree 80 as shown in FIG. 4, it will be understood that each saw is pivotally mounted beneath the sloping surface 18 so that it can be swung downwardly to be below the line of travel of the chains 52 and 54. In this lowered position a saw will not engage a tree passing thereover.

Figure 5:
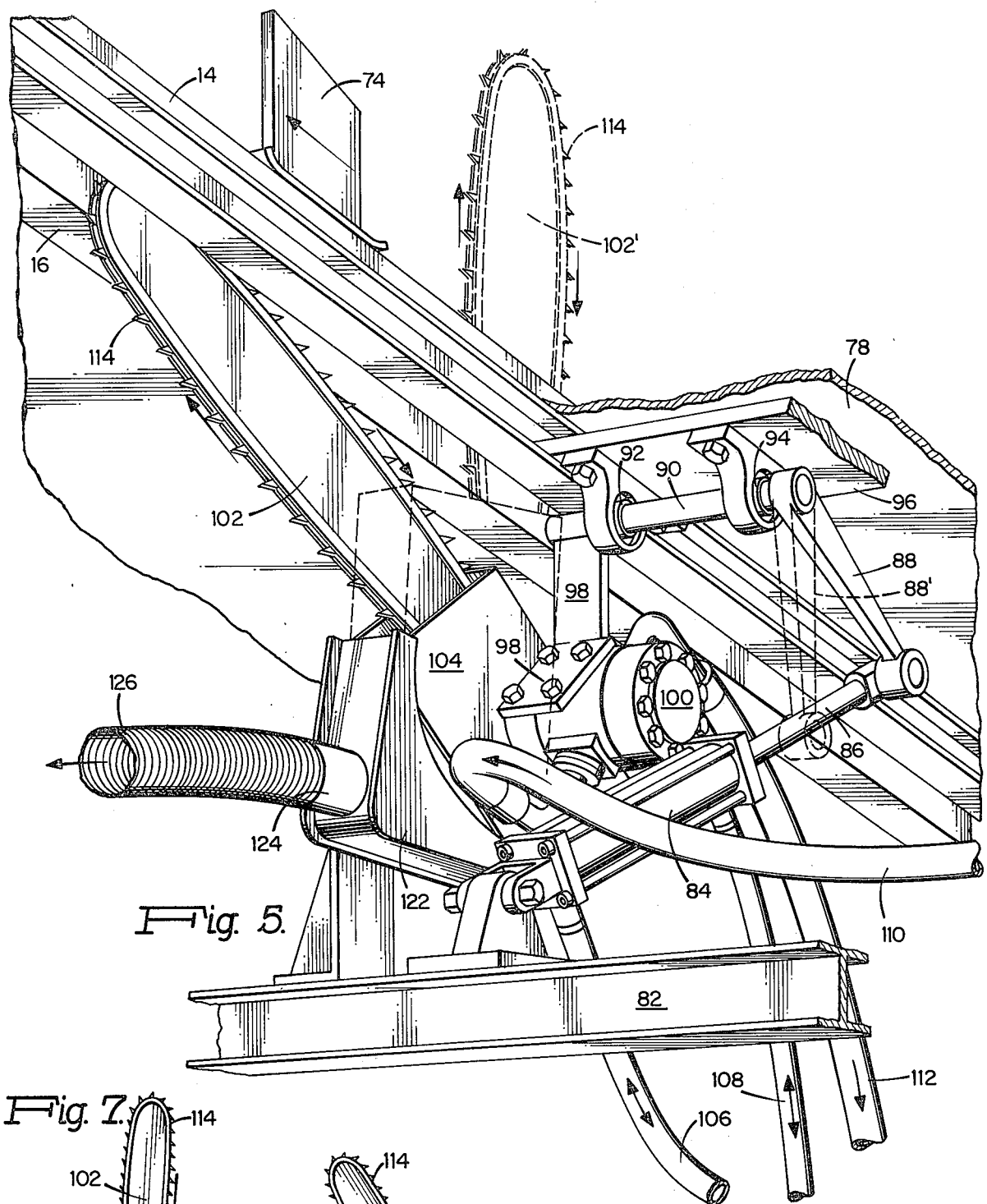
FIG. 5 shows the manner in which a chain saw is mounted on the frame and the means for swinging the saw from non-cutting to cutting position.

The mounting mechanism and drive motor for each saw is shown in FIG. 5. At each saw location, there is an intermediate beam 82 mounted on the main beams 4 and 6. The intermediate beam supports the lower end of a cylinder 84 having a piston 86. The piston is pivotally connected to crank arm 88, the other end of which is keyed to shaft 90. Shaft 90 is mounted in bearings 92 and 94 carried in appropriate pillow blocks which are bolted or otherwise secured to the underside of plate 96 which in turn is secured to the underside of sloping surface plate 78.

A strong steel bent plate 98 is secured to the other end of shaft 90. On this plate is mounted the chain saw unit which includes hydraulic motor 100, the saw 102 and the chip collecting housing 104.

Hydraulic supply hoses 106 and 108 feed cylinder 84 under the control of the operator. When piston 86 is extended as shown in FIG. 5, the saw 102 will be in down position. When the piston is retracted, the crank arm 88 will be moved to the dotted line position 88' and the plate 98 will likewise be moved clockwise through the same angle, thus causing the saw to be swung upwardly to the dotted line position 102'. In this position the saw 102 will extend between channels 14 and 16 and will be ready to cut through a tree as the tree is moved thereagainst by the dogs 74 and 76.

Hydraulic motor 100 is fed by supply hose 110 with the discharged fluid leaving through hose 112. Motor 100 and the chain 114 run continuously whether the saw be in down or up position. This is considered preferble to stopping the chain when in inoperative down position because when the chain is running free in down position there is negligible wear on the chain and little load on motor 100. To stop the motor 100 in down position would require another set of controls and valves to further complicate the work of the operator.

By the foregoing arrangement the operator by the movement of a single control lever (the control levers are shown in FIG. 1 at 116 in front of the operators' seat 118) may reverse the flow of fluid through hoses 106 and 108 to shift each saw independently of the others from up operative position to down inoperative position.

Figures 7, 8:
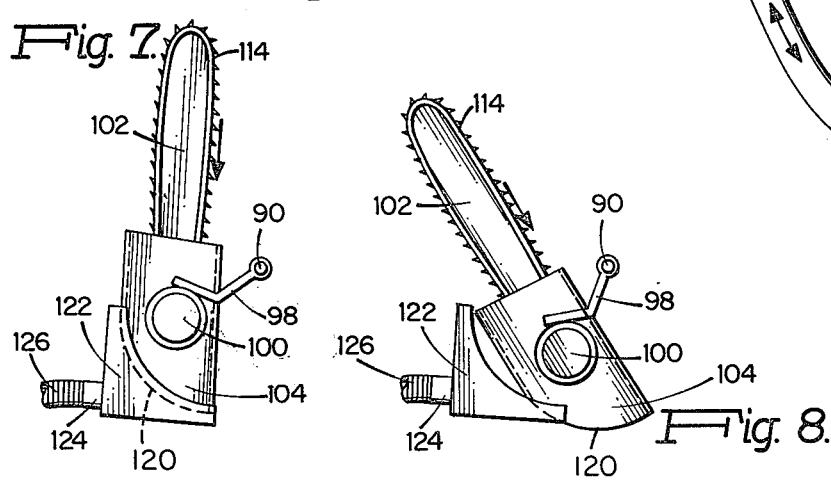
FIG. 7 shows the saw in operative position with the suction housing closed.
FIG. 8 shows the saw in inoperative position with the suction housing open.

The chip housing 104 surrounding the lower end of saw 102 is tubular and is affixed to the side of its motor 100. Housing 104 moves with the motor and saw as their position is shifted by the movement of plate 98. As can be seen in FIGS. 7 and 8, when the saw is in down position and producing no chips, the bottom end 120 is in open position at the right. When the saw is in operating position and producing chips as in FIG. 7, the lower end 120 of housing 104 will be located within the walls of a cooperating fixed housing 122 having an outlet 124 connected to suction pipe 126. Housing 122 is mounted on beam 82.

THE CHIP REMOVAL SYSTEM

Figure 6:
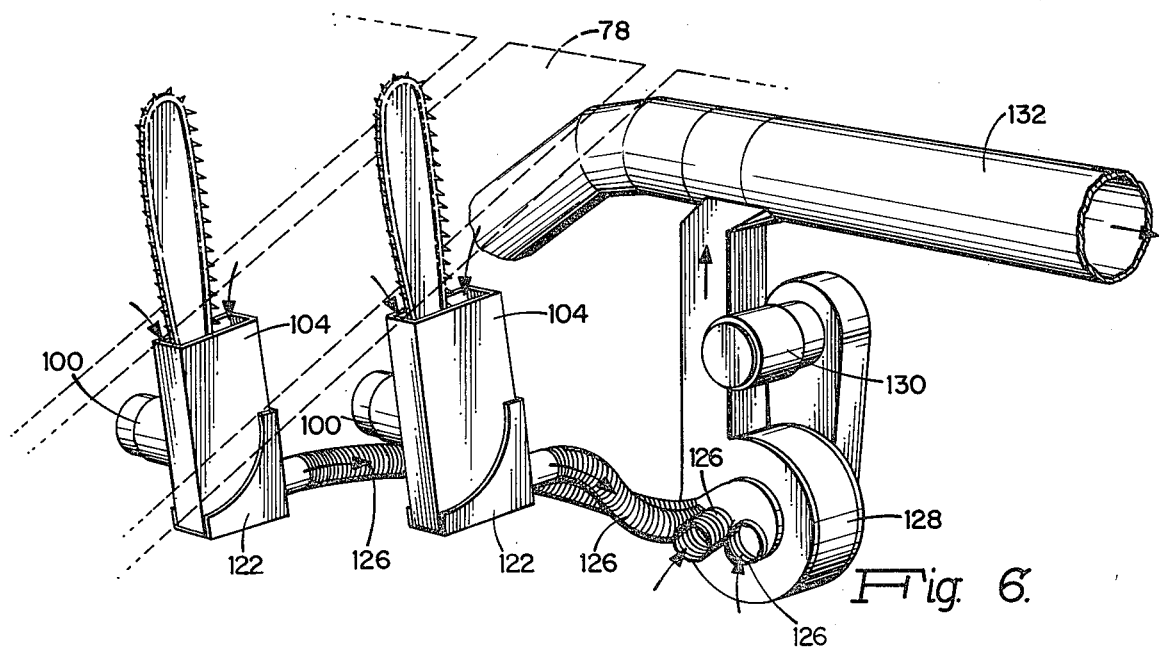
FIG. 6 shows part of the suction system for removing chips.

Each chain saw has at its lower end housings 104 and 122. Each housing has its individual suction pipe 126 and these pipes, as shown in FIG. 6, lead to a large blower 128, driven by hydraulic motor 130, which blower discharges into a main discharge pipe 132. The outlet end of pipe 132 is located at the chip collecting position, whether that position be a truck, a container, a pile on the ground, a conveyor belt or otherwise. All of these suction and delivery pipes are on the underside of sloping plates 78 as can be seen in FIG. 5 and hence are not visible in FIGS. 1 and 4.

To take care of the chip output of fourteen saws, it has been found desirable to provide three motor and blower sets 130 and 128 with each blower capable of handling the chip output of at least five saws. All three blowers feed into large discharge pipe 132 so that all chips can be collected at a single location.

HYDRAULIC DRIVE SYSTEM

As previously mentioned, all of the operating parts are driven by hydraulic motors. The hydraulic fluid is forced under pressure to the various motors by a plurality of hydraulic pumps all of which are driven preferably by a single internal combustion engine mounted on one end of the main frame.

Figure 9:
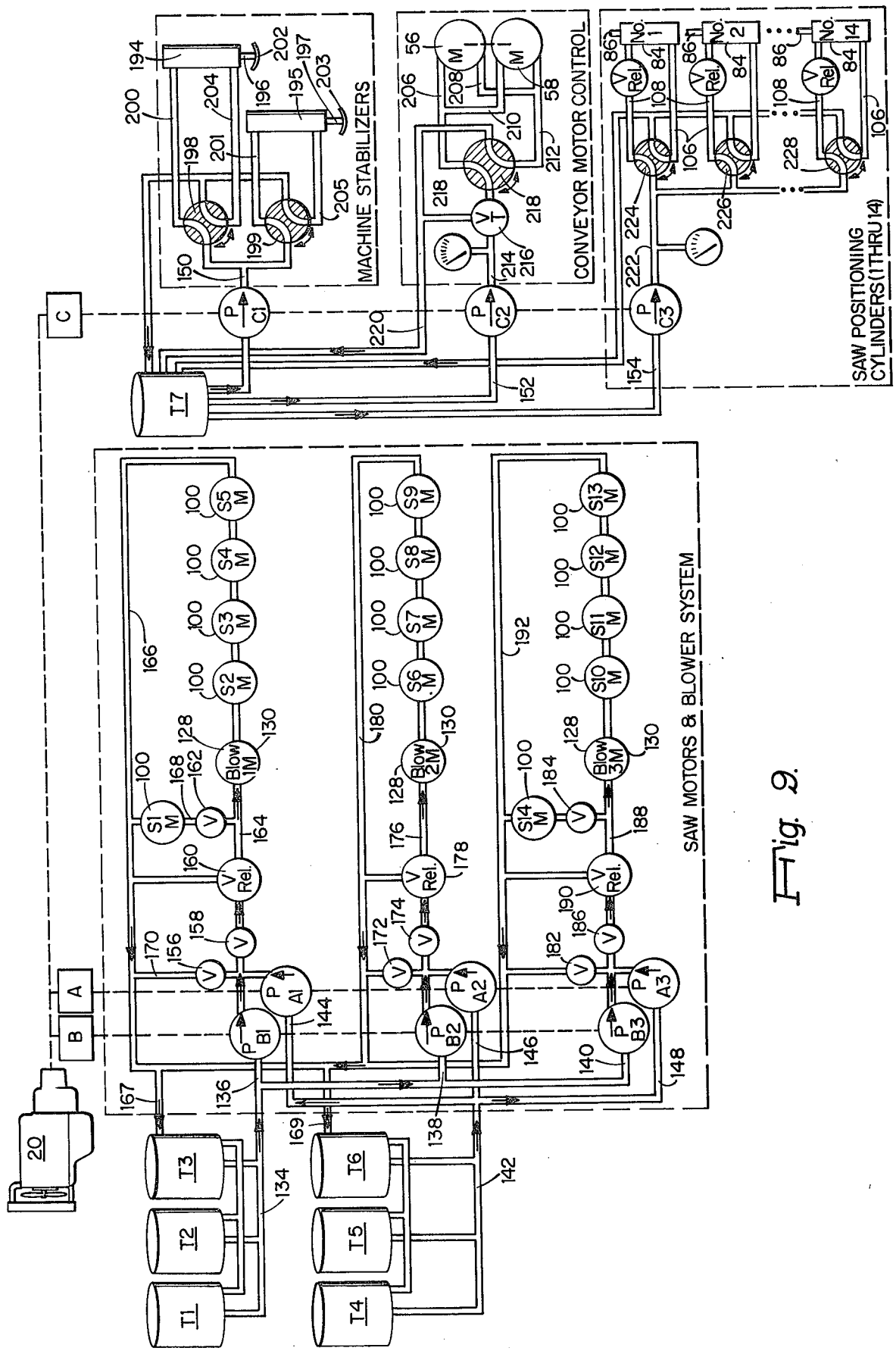
FIG. 9 is a diagram of the various hydraulic systems.

The various hydraulic circuits and their controls are shown in FIG. 9 along with the engine and pumps. The engine 20, ordinarily a high horsepower Diesel, drives by suitable gearing and separate drive shafts, three pumps A, B and C. Each of these is known as a triple pump in which there are three independent smaller pumps A1, A2, A3, B1, B2, B3 and C1, C2, C3 with separate inlets and outlets.

When the slasher is in operation, all of the pumps run continuously. They are supplied with suitable hydraulic fluid, usually oil, from a plurality of supply tanks numbered T1, T2, T3, T4, T5, T6 and T7. Tanks T1, T2 and T3 supply oil through pipe 134 and related parallel lines 136, 138 and 140 to motors B1, B2 and B3. Tanks T4, T5 and T6 likewise supply oil to motors A1, A2 and A3 through pipe 142 and related parallel lines 144, 146 and 148. Tank T7 supplies motor C1 through pipe 150, motor C2 through pipe 152 and motor C3 through pipe 154.

OPERATION OF SAWS DRIVEN BY PUMPS A1 AND B1

With valves 156 and 162 closed and with valve 158 open, pumps A1 and B1 will force oil through pipe 164 past pressure relief valve 160 through blower motor 130 of blower 128 and then on to the motors 100 of saws S2, S3, S4 and S5 all of which are arranged in series. The oil returns to the tanks through pipe 166 and the parallel branches 167 and 169. If it is desired to place saw S1 in operation, valve 162 under control of the operator may be opened causing oil to flow through pipe 168 into its related motor 100. If for some reason it should be necessary to shut down saws S1, S2, S3, S4 and S5 while engine 20 is running, this can be done by closing valve 158 and opening by-pass valve 156 so that oil flows through pipe 170 to return 166.

OPERATION OF SAWS DRIVEN BY PUMPS A2 AND B2

With valve 172 closed and valve 174 open, pumps A2 and B2 will force oil through pipe 176 past relief valve 178 to the motors 130 and 100 of the second blower 128 and saws S6, S7, S8 and S9 respectively, all of which are arranged in series. The oil returns to the tanks through pipe 180 and the branches 167 and 169. These saws and the blower may be shut down by closing valve 174 and opening by-pass valve 172.

OPERATION OF SAWS DRIVEN BY PUMPS A3 AND B3

With valves 182 and 184 closed and valve 186 open, pumps A3 and B3 will force oil through pipe 188 past relief valve 190 to operate motor 130 of the third blower 128 and the motors 100 of saws S10, S11, S12 and S13. Oil returns to the tanks through pipe 192 and the branches 167 and 169. Saw S14 can be put in operation by opening valve 184 which is under the control of the operator. These saws and the blower may be shut down by closing valve 186 and opening by-pass valve 182.

In the foregoing discussion of the operation of pumping system related to pumps A and B, the only valves that are directly under the control of the operator are valves 162 and 184 associated with the motors 100 of saws S1 and S14.

OPERATION OF MECHANISMS RELATED TO PUMP C

Still referring to FIG. 9, the pump C is a triple pump of which pump C1 operates the machine stabilizers, pump C2 drives the conveyor motors and pump C3 provides the fluid pressure necessary to operate the fourteen cylinder and piston combinations 84 and 86 that individually shift the saws from down to up and to down positions.

MACHINE STABILIZER

Referring to FIG. 1, one of the two stabilizers 36 is shown. The other is in a similar position on the other side of the machine. The movement of stabilizers 36 is controlled by cylinders 194, 195 and pistons 196, 197. With valve 198 (see FIG. 9) under the control of the operator and in the position shown, oil will exert pressure through pipe 200 and the piston 196 of cylinder 194 will be forced downward causing the foot 202 to be firmly planted on the ground. Another valve 199, also under the control of the operator, positioned as shown in FIG. 9, permits oil to exert pressure through pipe 201 to force piston 197 of cylinder 195 downward to plant foot 203 firmly against the ground. The two stabilizers thus are effective to prevent tilting of that end of the machine carried by the fifth wheel of the tractor. When the machine is to be moved, the operator reverses valves 198 and 199 so that pressure is now exerted through pipes 204 and 205 and the pistons 196 and 197 and the feed 202 and 203 are raised away from the ground.

CONVEYOR MOTOR CONTROL

On referring to FIG. 4 it will be recalled that there are two hydraulic motors 56 and 58 which together drive shaft 40 and all of the conveyor chains 52 and 54 that run in the channels 14 and 16. Motors 56 and 58 are reversible, their direction controlled by the direction of oil feed through their supply pipes 206, 208 and 210, 212.

Now referring to FIG. 9, oil is delivered by pump C2 to flow through pipe 214 to a speed control valve 216 and thence into directional control valve 218. In the position shown, oil will flow through pipes 206 and 210 causing motors 56 and 58 to rotate in the direction that drives the chains 52 and 54 and their related dogs 74 and 76 upward to force a tree against the saws. Oil from motors 56 and 58 returns to tank T7 through pipes 208 and 212 and return line 220. The rotational speed of motors 56 and 58 can be controlled by changing the volumn of oil passing through valve 216, the setting of which is under control of the operator.

Motors 56 and 58 may be brought to a halt by 45° rotation of valve 218 which will block any flow of oil through the pipes 206, 208, 210 and 212 leading to the motors 56 and 58. With the motors stationary, any tree resting on the dogs 74, 76 will likewise cease its movement.

If it is found necessary to cause a tree in the process of being cut to back downward away from one or more saws, the valve 218 may be moved through 90° to cause the oil from pump C2 to flow through pipes 208 and 212 thereby to cause motors 56 and 58 to reverse direction and causing the chains and dogs to travel downward.

Speed control valve 216 and directional control valve 218 are actuated by foot treadles both under the operator's control. These treadles 230 and 232 are shown in FIG. 1.

SAW POSITIONING CYLINDERS

Again referring to FIG. 5, oil flowing into cylinder 84 through pipe 106 will force piston 86 to the right to move saw 102 to down inoperative position. When oil flows into cylinder 84 through pipe 108, the piston 86 will be driven to the left and the saw 102 will be raised to up oerative position.

Now referring to FIG. 9 and the pump C3 forces oil received from tank T7 through pipe 154 and through pipe 222 simultaneously to fourteen separate valves arranged in parallel and of which three are shown at 224, 226 and 228.

Each of the 14 valves, all of which are independently controlled by the operator, controls the flow of oil to its related cylinder and piston 84, 86.

Thus in FIG. 9, with the valves 224, 226 and 228 in the positions shown the pistons 86 will all be in down position within cylinders 84 and the related saws S1, S2 and S14 will all be in up operative position.

Upon reversal of any of the 14 valves, of which valves 224, 226 and 228 are illustrative, the related saw may be shifted to its down inoperative position.

In this way the operator may at will establish almost instantly the position of each of the 14 saws throughout the length of the machine. If the effective distance between adjacent saws is such as to produce a log 4 feet long, the operator can set the saws to produce cut logs from a tree in any lengths which are multiples of four feet.

The angle at which the saw attacks the tree has been predetermined. It is such that the tree stays firmly in place against the dogs without any tendency to rotate or jump.

To increase the life of the chain saws, a lubrication system (not shown in the drawings) is provided in which there is a pressure tank containing special lubricating oil. A main oil feed line leads from the tank to the operator's position from which fourteen smaller pipes run in parallel to each of the fourteen saws. In each of the fourteen individual pipes is a valve under the control of the operator. Periodic opening of these valves allows oil in adequate quantity to be fed to each saw at a position between the chain, drive gear and track over which it travels to insure well lubricated operation. This controllable lubrication system is of importance because some of the saws that cut the larger parts of the tree run under heavier loads and hence require more lubrication than the more lightly loaded saws.

SUMMARY OF THE CONTROLS AVAILABLE TO THE OPERATOR

Referring again to FIG. 1, the operator sitting in seat 118 is in a position to observe the full length of the slasher. He has in front of him a set of lever 116 which in the situation described above will total 16. There are two levers to control the two stabilizers 36 through actuation of valves 198 and 199 which in turn control the positions of stabilizer pistons 196 and 197.

There are 14 levers to control the fourteen valves (224, 226, 228 etc.) each of which controls the position of the piston 86 in its cylinder 84. Thus these 14 levers as moved by the operator determine the up or down position of each saw.

In addition, there are two foot treadles 230 and 232. Treadle 230 controls valve 216 and treadle 232 controls valve 218. Suitable operation of treadles 230 and 232 enables the operator to control the movement of a tree along the sloping surface 78. Normally the tree will continuously advance upwardly to be cut by the saws. The rate of advance can be varied to meet the permissible rate of sawing. If binding should occur, advance may be stopped or the movement of the tree may be reversed temporarily until any difficulty has been cleared.

As mentioned above, there are 14 individual valves in the chain saw lubrication system which the operator may periodically open whenever he deems it necessary to add oil to particular saws.

SUMMARY OF OPERATION

With the slasher set up as shown in FIG. 1, engine 20 is started and pumps A, B and C come into operation. The operator is seated in seat 118.

Knowing the type and general length of the trees that are to be cut, the operator actuates the necessary levers in the group at 116 to raise appropriate saws to up operative position. In FIG. 1, all 14 saws are in up operative position and in this setting, the saws will cut a tree into 4 foot lengths.

It might be noted that the spacing of the saws makes allowance for the width of the saw cut so that the cut logs will always be at least as long as the required length.

Felled trees from which the branches have been trimmed are brought to and piled along side the slasher. A loader adjacent the pile of trees picks up a first tree and positions it on the side supports 26. The tree is located longitudinally by placing its butt end against an end stop 234 (see FIG. 1). The tree immediately slides to the bottom of the V formed by supports 26 and the sloping surface 78. The operator has placed the conveyor in motion so that the next group of dogs 74, 76 engage the side of the tree and start it up the incline. The saws which are arranged in staggered fashion successively cut the tree into a plurality of lengths which are predetermined by the arrangement of the saws.

A tree indicated in dotted line at 236 in FIG. 1 has been sawed into 13 four-foot lengths which are about to topple over the top edge of the slasher to fall to the ground, onto a conveyer, into a waterway or onto some other appropriate landing place.

As soon as the first tree has started up the incline, the loader places a second tree in the V where it is picked up by the next set of dogs to be cut up by the saws in the same manner as the first tree was cut.

The slasher is capable of cutting each tree into logs at least as rapidly as the loader is able to load the machine. Should the loader get ahead of the machine or fall behind, it has no effect on the sawing operation as the conveyors and saws are running continuously.

Since a tree is never exactly straight, it follows that it never will be simultaneously engaged by all of the dogs 74, 76 at the start of upward movement. However, as the cuts are progressively made, the cut sections fall back on the dogs so that by the time all of the logs have been cut, each log will be supported close to its ends by dogs 74 and 76 and the logs will be substantially aligned as is indicated by the logs of tree 236 shown in FIG. 1.

Whenever it is desired to change from the four-foot pulpwood length to 16 feet lumber length for example, the operator will lower saws S2, S3, S4, S6, S7, S8, S10, S11 and S12 leaving only saws S1, S5, S9 and S13 in operation. This will result in cutting the tree into three 16 foot lengths as illustrated in FIG. 2.

The foregoing should make it clear that the operator can change the lengths to be cut in any tree at will. If extra time is needed to adjust the saws, the conveyor may be slowed or stopped through the operation of foot treadles 230 and 232.

If one of the saw chains should be damaged or broken, requiring replacement, this repair can be done in a very short time. All pumps A, B and C are shut down so that the saw chains and conveyors are stationary. The damaged saw is then replaced by a simple mechanical procedure well understood in the chain saw art.

The foregoing description of a preferred embodiment of the invention is to be considered as illustrative of the nature of the invention and not in any way limiting. Other modifications which will suggest themselves to persons skilled in the art are intended to be covered by the appended claims.

We claim:
1. A tree slasher comprising s supporting frame, a transversely upwardly sloping surface carried by said frame and whose long dimension is more or less as long as the tree to be cut, said surface being interrupted at selected intervals with pairs of spaced tracks in each of which resides a continuous conveyor chain with the remaining portion of each said chain running beneath said sloping surface, a plurality of spaced dogs on each said chain, all said dogs being longitudinally aligned with the dogs on the other said chains, a first hydraulic motor and other means for driving all said chains at the same speed along said tracks, a chain saw located between each said pair of spaced tracks and an individual hydraulic motor for driving each said chain saw, a hydraulic cylinder and piston and other associated means for moving the cutting part of each said chain saw from a cutting position above said sloping surface to a non-cutting position below said sloping surface, a prime mover mounted on said frame, hydraulic pumps driven by said prime mover, oil tanks supplying said pumps, hydraulic pipe lines running from one of said pumps to said first hydraulic motor which drives said conveyor chains, other hydraulic pipe lines running from other pumps to said individual hydraulic motors which drive said chain saws, other hydraulic pipe lines running from one of said pumps to said hydraulic cylinders and pistons which control the positions of said chain saws, manually operable means for controlling the operation of said first hydraulic motor that drives said conveyor chains, and manually operable means for actuating selectively each hydraulic cylinder and piston for positioning each said saw.

2. The construction set forth in claim 1 and means for collecting in one location all of the chips produced by all of the chain saws that are operative during the cutting of each tree.

3. The construction set forth in claim 2, said collecting means comprising a housing around the lower end of each said chain saw, and suction and blower means operated by a hydraulic motor for moving chips from said housing to said collecting location.

4. The construction set forth in claim 1, said pumps that drive the motors of said chain saws being divided into a plurality of pairs of pumps with each pair of pumps supplying oil to a group of said chain saw motors arranged in series.

5. The construction set forth in claim 4, and two other chain saw motors being connected to said pumps by separate parallel pipe lines, and individual manually controlled means for stopping the flow of oil to said two other chain saw motors while said group of chain saw motors that are in series remain in operation.

6. The construction set forth in claim 4, and at least one hydraulic motor for driving a blower located in at least one of the said pipe lines in which said chain saw motors are arranged in series.

7. A tree slasher comprising a main frame having a transversely sloping surface, said surface long enough to accept the tree trunk to be cut, a plurality of pairs of spaced conveyor chains with dogs thereon moveable upwardly across said sloping surface whereby a tree trunk may be moved upwardly, a remotely controlled motor for driving said conveyor chains, a plurality of chain saws each pivotally mounted below said surface and between each pair of conveyor chains, remotely controlled means for selectively moving each said chain saw on its said pivot from a position below said surface to a position above said surface, and means for collecting chips produced by said chain saws in cutting said tree trunk and for delivering said chips to single location.

8. The construction set forth in claim 7, said chip collecting and delivering means comprising a housing around the inner end of each chain saw, a suction pipe extending from said housing, and a delivery pipe leading to said chip collecting location.

9. The construction set forth in claim 7, one end of said main frame mounted on wheels and the other end of said frame mounted on a tractor.

10. The construction set forth in claim 7 and a plurality of removable tree supports extending laterally from the lower edge of said sloping surface, said supports sloping oppositely to said sloping surface whereby a tree placed thereon will slide to a position to be engaged by said dogs.

11. The construction set forth in claim 1 and means for individually lubricating each of the chain saws.

12. The construction set forth in claim 7 and means for individually lubricating each of the chain saws.

13. The construction set forth in claim 7, said motors being of the hydraulic type and the means for causing turning of said chain saws comprising a hydraulically actuated cylinder and piston mounted beneath said surface.

14. A tree slasher comprising a supporting frame, a transversely extending surface carried by said frame and across which a tree trunk is to be moved as it is being cut into selected lengths, said surface being interrupted at selected intervals with transversely extending pairs of spaced conveyor chains with aligned dogs thereon, a motor and other related means for driving all said chains and dogs at the same speed whereby a tree trunk may be moved by said dogs across said surface, a plurality of chain saws mounted on pivots below said surface and each saw positioned between each said pair of conveyor chains, an individual motor for driving each said chain saw, means for causing each said chain saw to turn on its said pivot whereby each said chain saw can be individually moved from a position below said conveyor chains where it will not engage a tree trunk passing thereover to a position above said conveyor chains where it will cut a tree trunk moved there against by said dogs, individual housings beneath said surface, each housing enclosing the lower end of each said chain saw when said saw is in up cutting position whereby chips created by said saw will be caught in said housing and suction means for removing said chips from said housing.

15. The construction set forth in claim 14 and an operator's control station at one end of said frame, control means extending from said station to said conveyor chain driving motor and to said means for causing turning of each said chain saw on its respective pivot, and means at said station manually operable to selectively actuate said control means.

* * * * *